US006806761B1

(12) United States Patent
Aude

(10) Patent No.: US 6,806,761 B1
(45) Date of Patent: Oct. 19, 2004

(54) INTEGRATED CHARGE PUMP CIRCUIT WITH LOW POWER VOLTAGE REGULATION

(75) Inventor: Arlo Aude, Atlanta, GA (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 10/427,334

(22) Filed: May 1, 2003

(51) Int. Cl.$^7$ .............................................. G05F 1/10
(52) U.S. Cl. ................................................. 327/536
(58) Field of Search ............................... 327/530, 534, 327/535, 536, 537

(56) References Cited

U.S. PATENT DOCUMENTS

| 5,920,225 A | * | 7/1999 | Choi et al. ............... 327/536 |
| 6,072,357 A | * | 6/2000 | Jo ........................... 327/536 |
| 6,456,153 B2 | | 9/2002 | Buck et al. |

OTHER PUBLICATIONS

Favrat et al., A High–Efficiency CMOS Voltage Doubler, IEEE Journal of Solid–State Circuits, vol. 33, No. 3 Mar. 1998, pp410–416.

Sumanen et al., A Mismatch Insensitive CMOS Dynamic Comparator for Pipeline A/D Converters, The 7$^{th}$ IEEE International Conference, 2000, vol. 1, pp. 32–35.

Sumanen et al., CMOS Dynamic Comparators for Pipeline A/D Converters, IEEE International Symposium, 2002, vol. 5, pp. 157–160.

* cited by examiner

*Primary Examiner*—Jeffrey Zweizig
(74) *Attorney, Agent, or Firm*—Vedder Price Kaufman & Kammholz, P.C.

(57) ABSTRACT

An integrated charge pump circuit providing a regulated output voltage controlled by a voltage regulator with reduced power requirements in which the charge pump output voltage is a substantially constant multiple of the charge pump input voltage as defined by a voltage ratio which, in turn, is defined as a selected combination of a ratio of conductances of circuit elements within a feedback loop and ratios of other voltages including selected reference voltages and the charge pump input voltage.

20 Claims, 2 Drawing Sheets

INTEGRATED CHARGE PUMP CIRCUIT WITH LOW POWER VOLTAGE REGULATION

BACKGROUND OF THE INVENTION

1. Field of the Invention

The present invention relates to charge pump circuits, and in particular, to integrated charge pump circuits providing a regulated output voltage with reduced power requirements for the voltage regulation control.

2. Description of the Related Art

As mobile electronic devices become more sophisticated in terms of features, power consumption becomes increasingly problematic since such increased functionality often requires more power, and as the devices become smaller, battery size becomes more of an issue. Generally, the solution to this has been to use low voltage integrated circuitry, which has improved significantly in recent years. It is now common for many integrated circuit devices to operate with power supply voltages of only two or three volts.

However, low voltage operation, while beneficial in many applications, still suffers from problems caused by some minimum voltages required by various devices or circuits. For example, field effect transistors, commonly used for various switching functions, require minimum gating voltages so as to function properly within favorable operating ranges. Similarly, some amplifier circuits, in order to provide sufficient output signal power, require higher power supply voltages.

Accordingly, many integrated circuit applications include charge pump circuits for amplifying, or multiplying, certain biasing or supply voltages. These charge pumps are powered by the normal power supply voltage VDD and typically operate in a two-stage switched mode of operation to provide a multiplied output voltage. In the initial phase of operation, a capacitor is charged to the level of the power supply voltage. Subsequently, during the next phase of operation, the circuit is switched such that the power supply voltage and charged capacitor voltage are connected in a serial arrangement to the output so as to create an elevated voltage. Such a charge pump is capable of providing as much as two times the power supply voltage VDD at its output terminal. Often, such charge pumps are used as power supplies for driving output capacitors.

While such charge pumps can provide increased voltages, the actual voltage available will vary depending upon the load conditions and power supply variations. For example, when the load is relatively large (i.e., a relatively large output, or load, current is required) and the power supply voltage (e.g., supplied by a battery) is relatively low, the multiplied voltage provided by the charge pump will become lower than desired. On the other hand, when the load is relatively small (i.e., the load current is relatively small) and the power supply voltage is relatively high (e.g., as can be true with a new set of batteries), the voltage provided by the charge pump may be too high, and thereby increase the possibility of inflicting damage upon some of the integrated circuit elements. Accordingly, accurate regulation of the charge pump output voltage is important.

One conventional technique of regulating a charge pump output voltage includes connecting a series of diodes to the charge pump output in a shunt connection, thereby preventing the output voltage from exceeding the maximum voltage defined by the sum of forward biased diode voltages. In the event that the charge pump output voltage becomes high enough to turn on the stack of diodes, output current is shunted through the diodes to circuit ground. However, for low power applications, such current drain is undesirable. Further, while this technique can prevent over-voltage conditions, it does not protect against under-voltage conditions.

Referring to FIG. 1, another conventional technique for regulating a charge pump output voltage relies upon the use of a controller 14 to control the clock generator 16 that drives the charge pump circuit 12. As discussed above, the power supply voltage 11 is multiplied by the charge pump 12 to produce the charge pump output voltage 13. This voltage 13 is monitored by the controller 14 which provides one or more appropriate control signals 15 to the clock generator 16. The clock generator 16, in turn, provides the appropriate differential clock signals 17 to drive the charge pump circuit 12.

Referring to FIG. 1A, these differential clock signals 17 include a non-inverted ("positive") 17p and inverted ("negative") 17n clock signal phases which are non-overlapping, i.e., with mutually exclusive asserted signal states.

One conventional implementation of this type 10 of regulated charge pump circuitry uses a controller 14 in which the charge pump voltage output voltage 13 is effectively sampled to provide the necessary control signals 15 for the clock generator 16 which, in turn, provides modulated clock signals 17 to drive the charge pump 12. While this has the beneficial effect of reducing current drain from the charge pump output 13, due to the sampling, such technique results in wasted power in the form of current drain through the sampled output since, during sampling, a large current from the charge pump output 13 becomes necessary since the sampling path must be of a low impedance so as to provide sufficient bandwidth for high frequency operation. (Further discussion of this type of regulated charge pump circuit can be found in U.S. Pat. No. 6,456,153, the contents of which are incorporated herein by reference.) For example, while increasing the impedance of the voltage sampling path will have the beneficial effect of reducing output current being shunted to ground, inherent parasitic capacitance associated with such current path, in conjunction with the high impedance, will substantially reduce the maximum operating speed of such sampling path.

Referring to FIG. 2, one conventional form 12a of the charge pump circuit 12 is a cross-coupled charge pump which includes N-type metal oxide semiconductor field effect transistors (N-MOSFETs) M15, M16, and P-type MOSFETs (P-MOSFETs) M13, M14, M17, M18, input coupling capacitors C1, C2, an output, or load, capacitor CLOAD, and an inherent parasitic capacitance CWELL between the power supply VDD terminal and the substrate well in which the transistors lie, all interconnected substantially as shown. Transistors M15 and M16 have their bulk regions connected to circuit ground, transistors M14, M17 have their bulk regions connected to the substrate well, as are the bulk regions and source terminals of P-MOSFETs M13 and M18. (Transistors M13 and M18 ensure that the substrate well is maintained at a voltage bias level sufficient to maintain output switching transistors M14 and M17 in their off states when reverse biased.) As can be seen, the N-MOSFETs are cross-coupled via their gate and source terminals, thereby providing automatic reverse bias of their respective gate-source junctions during switching by the differential input clock signal phases 17p, 17n. The switching of the outputs, so as to provide the voltage multiplication effect, as discussed above, is provided by P-MOSFETs M14, M17. (Further discussion of this charge pump circuit 12a can be found in Favrat et al., "A High-Efficiency CMOS Voltage Doubler," IEEE Journal of Solid-State Circuits, Vol. 33, No. 3, March 1998, the contents of which are incorporated herein by reference.)

SUMMARY OF THE INVENTION

In accordance with the presently claimed invention, an integrated charge pump circuit provides a regulated output voltage controlled by a voltage regulator with reduced power requirements in which the charge pump output voltage is a substantially constant multiple of the charge pump input voltage as defined by a voltage ratio which, in turn, is defined as a selected combination of a ratio of conductances of circuit elements within a feedback loop and ratios of other voltages including selected reference voltages and the charge pump input voltage.

In accordance with one embodiment of the presently claimed invention, an integrated charge pump circuit providing a regulated output voltage controlled by a voltage regulator with reduced power requirements includes terminals, output capacitance, charge pump circuitry, clock signal generator circuitry and control circuitry. An input power terminal conveys an input power voltage and an input power current. An input clock terminal conveys an input clock signal. The output capacitance responds to reception of the input power current by charging and providing an output power voltage. The charge pump circuitry, including first and second circuit branches and coupled to the input power terminal and the output capacitance, responds to reception of first and second clock signals with mutually exclusive signal assertion states by selectively conveying the input power current to the output capacitance alternately via the first and second circuit branches such that the output power voltage is a substantially constant multiple of the input power voltage as defined by an output ratio. The clock signal generator circuitry, coupled to the input clock terminal and the charge pump circuitry, responds to reception of the input clock signal and at least one control signal by providing the first and second clock signals. The control circuitry, coupled to the input power terminal, the input clock terminal, the output capacitance and the clock signal generator circuitry, responds to reception of first and second reference voltages, the input power voltage, the input clock signal and the output power voltage by providing the at least one control signal, and includes first and second pluralities of transistors having first and second conductances, respectively, responsive to the first and second reference voltages, the input power voltage and the output power voltage. A conductance ratio is defined by a ratio of the first and second conductances, a first input ratio is defined by a ratio of the first reference voltage and the input power voltage, a second input ratio is defined by a ratio of the second reference voltage and the input power voltage, and the output ratio is defined by a selected combination of the conductance ratio and the first and second input ratios.

In accordance with another embodiment of the presently claimed invention, an integrated charge pump circuit providing a regulated output voltage controlled by a voltage regulator with reduced power requirements includes terminals, output capacitance, a cross-coupled charge pump circuit, a latch circuit and a dynamic signal comparator circuit. An input power terminal conveys an input power voltage and an input power current. An input clock terminal conveys an input clock signal. The output capacitance responds to reception of the input power current by charging and providing an output power voltage. The cross-coupled charge pump circuit, including first and second cross-coupled circuit branches and coupled to the input power terminal and the output capacitance, responds to reception of first and second clock signals with mutually exclusive signal assertion states by selectively conveying the input power current to the output capacitance alternately via the first and second circuit branches such that the output power voltage is a substantially constant multiple of the input power voltage as defined by an output ratio. The latch circuit, coupled to the input clock terminal and the cross-coupled charge pump circuit, responds to reception of the input clock signal and first and second control signals by providing the first and second clock signals. The dynamic signal comparator circuit, coupled to the input power terminal, the input clock terminal and the output capacitance, responds to reception of first and second reference voltages, the input power voltage, the input clock signal and the output power voltage by providing the first and second control signals, and includes first and second pluralities of transistors having first and second conductances, respectively, responsive to the first and second reference voltages, the input power voltage and the output power voltage. A conductance ratio is defined by a ratio of the first and second conductances, a first input ratio is defined by a ratio of the first reference voltage and the input power voltage, a second input ratio is defined by a ratio of the second reference voltage and the input power voltage, and the output ratio is defined by a selected combination of the conductance ratio and the first and second input ratios.

In accordance with still another embodiment of the presently claimed invention, an integrated charge pump circuit providing a regulated output voltage controlled by a voltage regulator with reduced power requirements includes output capacitor means, charge pump means, clock signal generator means and controller means. The output capacitor means is for receiving an input power current and in response thereto charging and generating an output power voltage. The charge pump means is for receiving an input power voltage and first and second clock signals with mutually exclusive signal assertion states and in response thereto providing the input power current to the output capacitor means such that the output power voltage is a substantially constant multiple of the input power voltage as defined by an output ratio. The clock signal generator means is for receiving the input clock signal and at least one control signal and in response thereto generating the first and second clock signals. The controller means is for receiving first and second reference voltages, the input power voltage, the input clock signal and the output power voltage and in response thereto generating the at least one control signal with first and second controllable circuit means having first and second conductances, respectively, responsive to the first and second reference voltages, the input power voltage and the output power voltage. A conductance ratio is defined by a ratio of the first and second conductances, a first input ratio is defined by a ratio of the first reference voltage and the input power voltage, a second input ratio is defined by a ratio of the second reference voltage and the input power voltage, and the output ratio is defined by a selected combination of the conductance ratio and the first and second input ratios.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, or a data signal. Within the drawings, like or related elements will have like or related alpha, numeric or alphanumeric designators.

Figure 3:
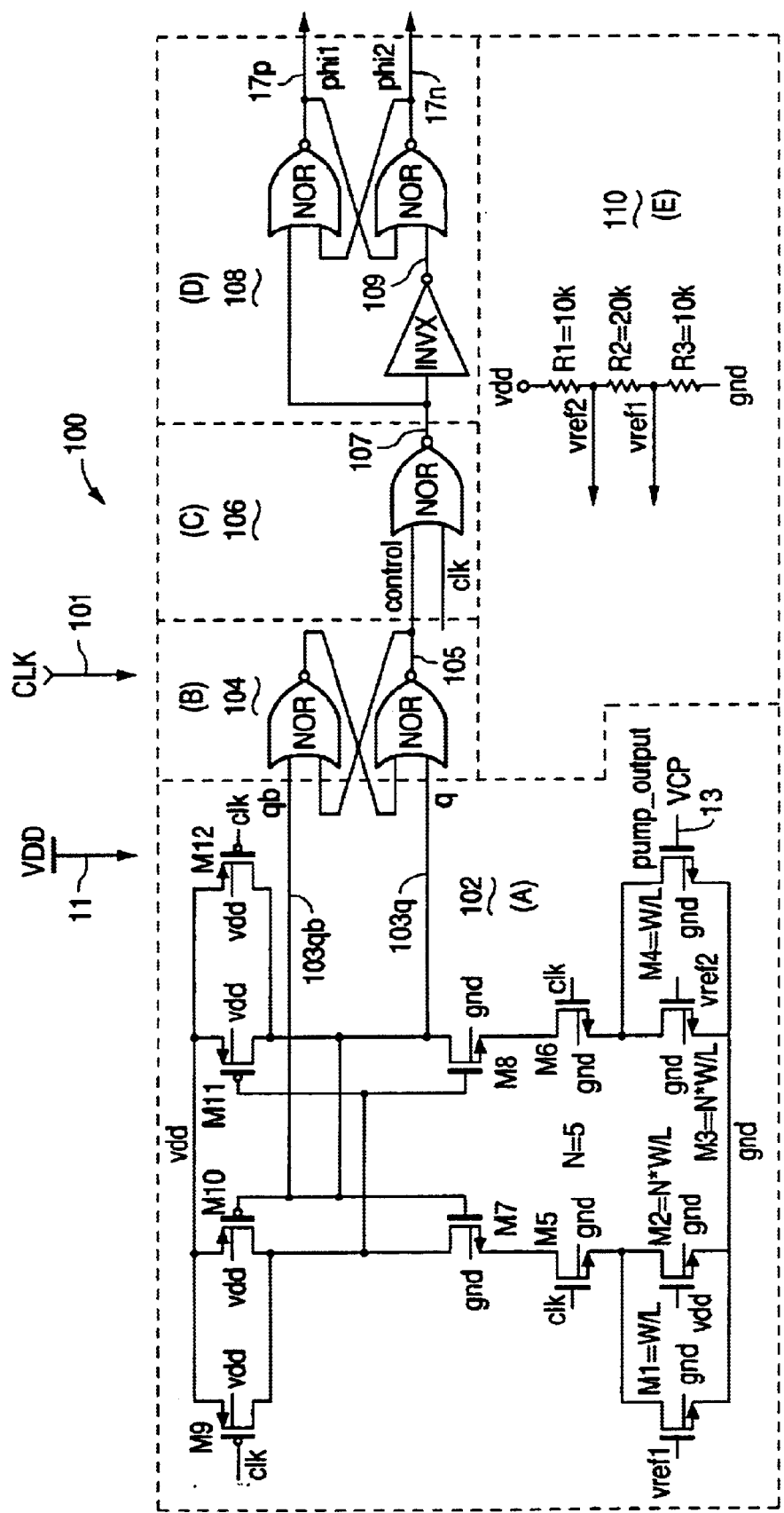
FIG. 3 is a schematic and logic diagram of control circuitry for providing modulated clock signals to regulate a charge pump circuit in accordance with one embodiment of the presently claimed invention.

Referring to FIG. 3, a voltage regulation control circuit 100 for regulating the output voltage of a charge pump circuit in accordance with one embodiment of the presently claimed invention includes a number of stages 102, 104, 106, 108, 110, which can be described as follows. The first stage 102 serves as the main control stage and can be implemented as a dynamic signal comparator circuit (discussed in more detail below). This circuit 102 generates a differential signal 103 having mutually inverse signal phases 103$q$, 103$qb$. The second stage 104 is a conventional reset-set (RS) flip-flop implemented with NOR gates. The next stage 106 is a gating circuit implemented with a NOR gate. The final signal stage 108 is a gated latch circuit implemented with cross-coupled NOR gates and an inverter INVX, and provides the modulated mutually inverse clock signal phases 17$p$, 17$n$. One additional stage 110 is a voltage divider circuit in which the power supply voltage VDD 11 is divided to produce two reference voltages VREF1, VREF2(discussed in more detail below).

The dynamic signal comparator circuit 102, sometimes also referred to as a resistive divider dynamic comparator, includes N-MOSFETs M1, M2, M3, M4, M5, M6, M7, M8, and P-MOSFETs M9, M10, M11, M12, all interconnected substantially as shown. The bulk regions of the N-MOSFETs M1–M8 are connected to circuit ground GND, while the bulk regions of the P-MOSFETs M9, M12 are connected to the power supply voltage VDD. The gate terminals of N-MOSFETs M5 and M6 and P-MOSFETs M9 and M12 are driven by the clock signal CLK 101. The gate terminals of transistors M1 and M2 are driven by reference voltages VREF1 and VREF2, respectively, while the gate terminals of M2 and M4 are driven by the power supply voltage VDD and charge pump output voltage VCP 13, respectively. The gate terminals of transistors M7 and M10 are cross-coupled to the drain terminals of transistors M8, M11 and M12, while the gate terminals of transistors M8 and M11 are cross-coupled to the drain terminals of M7, M9 and M10, as shown.

Transistors M1 and M4 are equal in size with predetermined transistor channel widths W and lengths L. Transistors M2 and M3, connected in parallel with transistors M1 and M4, respectively, have transistor sizes such that their width-to-length ratios W/L are larger by a factor N than the width-to-length ratios of transistors M1 and M4. (It will be understood that transistors M2 and M3 can also be implemented as multiple transistors, e.g., where transistor M2 is actually N transistors M2$a$, M2$b$, . . . , M2$n$ with each having transistor channel width W and length L, and transistor M3 is actually N transistors M3$a$, M3$b$, . . . , M3$n$ with each having transistor channel width W and length L.)

In the example of this circuit 100 as discussed herein the transistor dimension factor N is 5, while resistances R1, R2, and R3 forming the voltage divider circuit 110 have values of 10, 20 and 10 kilohms, respectively. However, it will be appreciated that other values of the transistor scaling factor N and resistances R1, R2, R3 can be selected as desired.

The operation of the dynamic signal comparator circuit 102 can be described as follows. When the input clock signal CLK is de-asserted (low), transistors M9 and M12 are turned on, i.e., conductive, and transistors M5 and M6 are turned off. This forces both differential output signals 103$q$, 103$qb$ high, substantially equal to the power supply voltage VDD, and no current path exists between the power supply VDD terminal and circuit ground GND. Meanwhile, transistors M10 and M11 are turned off, while transistors M7 and M8 are turned on. This causes a voltage substantially equal to the power supply voltage VDD to be applied across transistors M7 and M8.

When the input clock signal CLK is asserted (high), transistors M5 and M6 are turned on. Immediately following regeneration, the gate terminals of transistors M7 and M8, still remaining at the power supply voltage VDD, enter saturation. Provided that all of the upper transistors M5–M12 are matched, the imbalance of the circuit conductances of the left (transistors M1 and M2) and right (transistors M3 and 4) input circuit branches determines which of the output signals 103$q$, 103$qb$ goes high (approximately VDD) or low (approximately GND). Once a static operating condition has been reached (when the clock signal CLK is asserted), portions of both the upper left (transistors M7 and M10) and upper right (transistors M8 and M11) circuit branches are turned off, and the output signals 103$q$ and 103$qb$ retain their respective opposing signal values until the comparator circuit 102 is reset once again by de-asserting the clock signal CLK.

Figure 1:
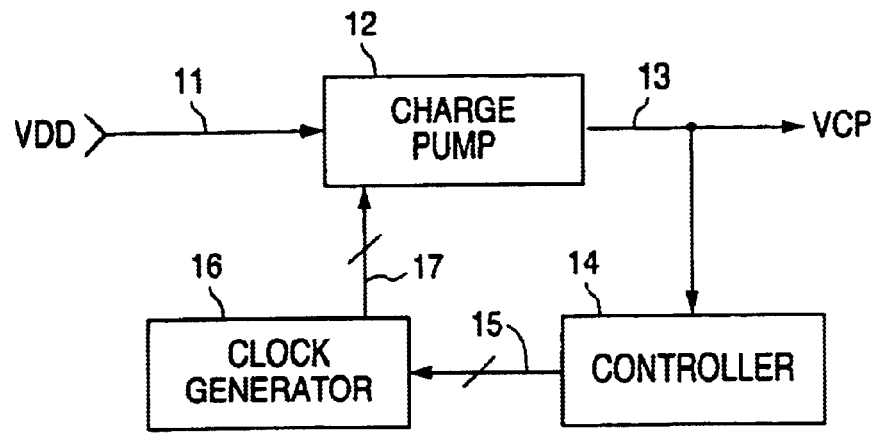
FIG. 1 is a functional block diagram of a conventional regulated charge pump circuit.
Figure 1A:
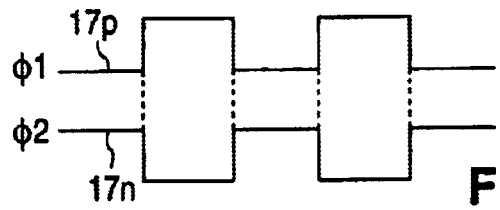
FIG. 1A is a timing diagram of the modulated differential clock signal phases for the circuit of FIG. 1.
Figure 2:
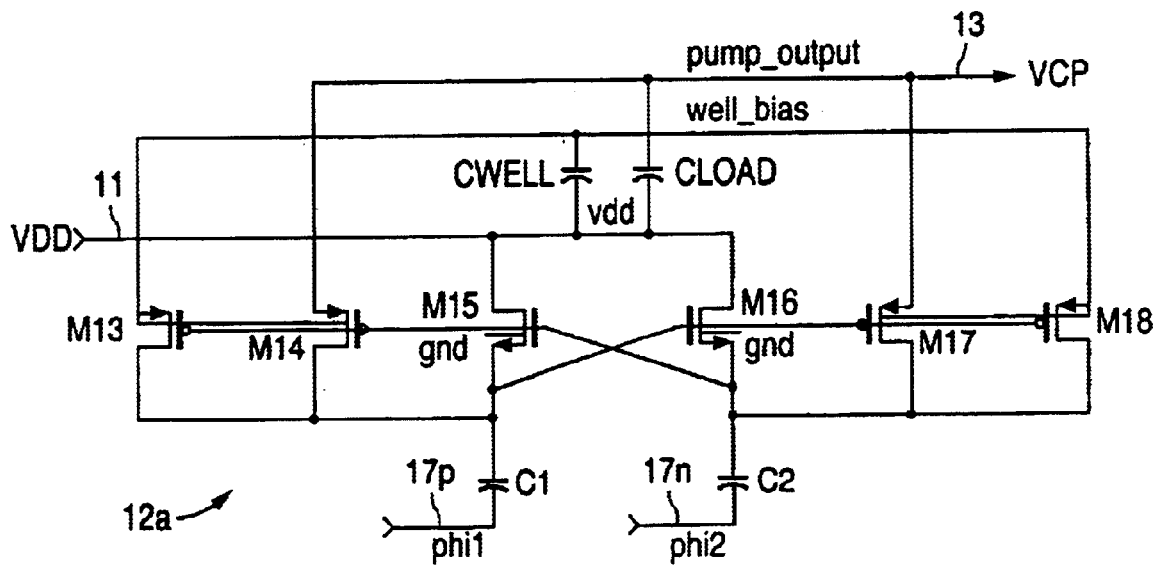
FIG. 2 is a schematic diagram of a conventional cross-coupled complementary MOSFET charge pump circuit.

The input transistors M1, M2, M3, M4, as noted above, are driven by the reference voltages VREF1, VREF2 and the input VDD and output VCP voltages of the charge pump circuit 12 (FIG. 1), and operate in their triode regions of operations, thereby acting like voltage-controlled resistances. Provided no other significant mismatches are present, the comparator circuit 102 changes the states of its output signals 103$q$, 103$qb$ when the conductances of the left (transistors M1 and M2) and right (transistors M3 and M4) input branches are equal. With transistors M1, M2, M3, and M4 scaled with a factor of 5, as discussed above, and reference voltages VREF1 and VREF2 being equal to 0.25*VDD and 0.75*VDD, respectively, it can be shown that the charge pump output voltage VCP will be higher than the power supply voltage VDD by a factor of 1.5, in accordance with the following equation.

$$VCP=VREF1+N*VDD-N*VREF2=1.5*VDD \quad (5)$$

With these particular circuit parameters, the common mode voltage of the two input transistor pairs M1/M2, M3/M4 is 0.875*VDD. It will, however, be appreciated that other combinations, i.e., other ratios of reference voltages VREF1, VREF2 to power supply voltage VDD and other transistor scaling factors N can be used to establish and regulate the charge pump output voltage anywhere between the power supply voltage VDD and double the power supply voltage (2*VDD).

Based upon the foregoing, it should be recognized that this dynamic signal comparator is particularly suitable for very high speed and accurate operation. For example, simulations have shown that this dynamic comparator circuit 102 can operate at nearly the maximum speed of a signal inverter in a standard complementary MOSFET process. The dynamic latch circuit 104 preserves the comparison value (signal 105) until the next cycle of the input clock signal CLK 101. The gating circuit 106 serves as a decision circuit that either turns on or off the clock signal 107 to the non-overlapping clock signal generator circuit 108.

One possible source of errors in the dynamic signal comparator circuit 102 is mismatches in the threshold voltages of the input transistors M1–M4. However, since the input voltages VDD, VCP, VREF1, VREF2 to these transistors M1–M4 are large in comparison, any errors introduced by such mismatches will be small.

As a result, the total signal delay through the comparator circuit 102 and dynamic latch circuit 104 is approximately equal to the delay through two inverters, thereby providing for very fast overall system operation. Therefore, the control signal 105 to the gating circuit 106 will transition within a very short time following transitions of the clock signal CLK within the comparator circuit 102. Further, since this control circuit 106 is implemented using a NOR gate, when the incoming control signal 105 transitions (either high or low), the output signal 107 is not affected until the input clock signal CLK transitions to a low state. Accordingly, this output signal 107 is always gated exactly by the falling edge of the clock signal CLK, so long as the control signal 105 transitions during the high, or asserted, state of the clock signal CLK, thereby rendering this circuit substantially synchronous with the clock signal CLK. This will be true so long as the speed of the comparator circuit 102 is faster than one half of the frequency of the clock signal CLK. Further, use of this type of control circuitry 100 with a cross-coupled charge pump 12 ensures that the charge pump 12 either starts or stops its operation within one half of a clock CLK cycle, and always starts with an output pump cycle.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an integrated charge pump circuit providing a regulated output voltage controlled by a voltage regulator with reduced power requirements, comprising:

an input power terminal to convey an input power voltage and an input power current;

an input clock terminal to convey an input clock signal;

output capacitance that responds to reception of said input power current by charging and providing an output power voltage;

charge pump circuitry, including first and second circuit branches and coupled to said input power terminal and said output capacitance, that responds to reception of first and second clock signals with mutually exclusive signal assertion states by selectively conveying said input power current to said output capacitance alternately via said first and second circuit branches such that said output power voltage is a substantially constant multiple of said input power voltage as defined by an output ratio;

clock signal generator circuitry, coupled to said input clock terminal and said charge pump circuitry, that responds to reception of said input clock signal and at least one control signal by providing said first and second clock signals; and control circuitry, coupled to said input power terminal, said input clock terminal, said output capacitance and said clock signal generator circuitry, that responds to reception of first and second reference voltages, said input power voltage, said input clock signal and said output power voltage by providing said at least one control signal, and includes first and second pluralities of transistors having first and second conductances, respectively, responsive to said first and second reference voltages, said input power voltage and said output power voltage, wherein
  a conductance ratio is defined by a ratio of said first and second conductances,
  a first input ratio is defined by a ratio of said first reference voltage and said input power voltage,
  a second input ratio is defined by a ratio of said second reference voltage and said input power voltage, and
  said output ratio is defined by a selected combination of said conductance ratio and said first and second input ratios.

2. The apparatus of claim 1, wherein said charge pump circuitry comprises a cross-coupled charge pump circuit.

3. The apparatus of claim 2, wherein said cross-coupled charge pump circuit comprises:

input capacitive coupling to convey said first and second clock signals;

cross-coupled switching circuitry, coupled to said input capacitive coupling, that responds to said first and second clock signals by switching said input power voltage;

output switching circuitry, coupled to said cross-coupled switching circuitry and including a plurality of transistors with respective bulk regions, that responds to said switched input power voltage by selectively conveying said input power current; and bulk switching circuitry, coupled to said plurality of transistors and said cross-coupled switching circuitry, that responds to said switched input power voltage by selectively applying a bias voltage to said respective bulk regions.

4. The apparatus of claim 1, wherein said clock signal generator circuitry comprises a gated latch circuit.

5. The apparatus of claim 1, wherein said control circuitry comprises a dynamic signal comparator circuit.

6. The apparatus of claim 5, wherein said control circuitry further comprises a latch circuit coupled to said dynamic signal comparator circuit.

7. The apparatus of claim 5, wherein:
said dynamic signal comparator circuit comprises first and second cross-coupled circuit branches;
said first circuit branch comprises respective portions of said first and second pluralities of transistors; and
said second circuit branch comprises further respective portions of said first and second pluralities of transistors.

8. The apparatus of claim 7, wherein:
said first circuit branch further comprises at least a first transistor coupled to said input clock terminal;
said second circuit branch further comprises at least a second transistor coupled to said input clock terminal;
said respective portions of said first and second pluralities of transistors are mutually coupled in parallel; and
said further respective portions of said first and second pluralities of transistors are mutually coupled in parallel.

9. The apparatus of claim 1, further comprising voltage generator circuitry, coupled to said input power terminal and said control circuitry, that responds to reception of said input power voltage by providing said first and second reference voltages.

10. The apparatus of claim 9, wherein said voltage generator circuitry comprises a voltage divider circuit.

11. The apparatus of claim 1, wherein said first and second clock signals are substantially synchronous with said input clock signal.

12. An apparatus including an integrated charge pump circuit providing a regulated output voltage controlled by a voltage regulator with reduced power requirements, comprising:
an input power terminal to convey an input power voltage and an input power current;
an input clock terminal to convey an input clock signal;
output capacitance that responds to reception of said input power current by charging and providing an output power voltage;
a cross-coupled charge pump circuit, including first and second cross-coupled circuit branches and coupled to said input power terminal and said output capacitance, that responds to reception of first and second clock signals with mutually exclusive signal assertion states by selectively conveying said input power current to said output capacitance alternately via said first and second circuit branches such that said output power voltage is a substantially constant multiple of said input power voltage as defined is by an output ratio;
a latch circuit, coupled to said input clock terminal and said cross-coupled charge pump circuit, that responds to reception of said input clock signal and first and second control signals by providing said first and second clock signals; and
a dynamic signal comparator circuit, coupled to said input power terminal, said input clock terminal and said output capacitance, that responds to reception of first and second reference voltages, said input power voltage, said input clock signal and said output power voltage by providing said first and second control signals, and includes first and second pluralities of transistors having first and second conductances, respectively, responsive to said first and second reference voltages, said input power voltage and said output power voltage, wherein
a conductance ratio is defined by a ratio of said first and second conductances,
a first input ratio is defined by a ratio of said first reference voltage and said input power voltage,
a second input ratio is defined by a ratio of said second reference voltage and said input power voltage, and
said output ratio is defined by a selected combination of said conductance ratio and said first and second input ratios.

13. The apparatus of claim 12, wherein said cross-coupled charge pump circuit comprises:
input capacitive coupling to convey said first and second clock signals;
cross-coupled switching circuitry, coupled to said input capacitive coupling, that responds to said first and second clock signals by switching said input power voltage;
output switching circuitry, coupled to said cross-coupled switching circuitry and including a plurality of transistors with respective bulk regions, that responds to said switched input power voltage by selectively conveying said input power current; and
bulk switching circuitry, coupled to said plurality of transistors and said cross-coupled switching circuitry, that responds to said switched input power voltage by selectively applying a bias voltage to said respective bulk regions.

14. The apparatus of claim 12, wherein:
said dynamic signal comparator circuit comprises first and second cross-coupled circuit branches;
said first circuit branch comprises respective portions of said first and second pluralities of transistors; and
said second circuit branch comprises further respective portions of said first and second pluralities of transistors.

15. The apparatus of claim 14, wherein:
said first circuit branch further comprises at least a first transistor coupled to said input clock terminal;
said second circuit branch further comprises at least a second transistor coupled to said input clock terminal;
said respective portions of said first and second pluralities of transistors are mutually coupled in parallel; and
said further respective portions of said first and second pluralities of transistors are mutually coupled in parallel.

16. The apparatus of claim 12, further comprising voltage generator circuitry, coupled to said input power terminal and said dynamic signal comparator circuit, that responds to reception of said input power voltage by providing said first and second reference voltages.

17. The apparatus of claim 16, wherein said voltage generator circuitry comprises a voltage divider circuit.

18. The apparatus of claim 12, wherein said first and second clock signals are substantially synchronous with said input clock signal.

19. An apparatus including an integrated charge pump circuit providing a regulated output voltage controlled by a voltage regulator with reduced power requirements, comprising:
output capacitor means for receiving an input power current and in response thereto charging and generating an output power voltage;
charge pump means for receiving an input power voltage and first and second clock signals with mutually exclusive signal assertion states and in response thereto providing said input power current to said output capacitor means such that said output power voltage is a substantially constant multiple of said input power voltage as defined by an output ratio;

clock signal generator means for receiving said input clock signal and at least one control signal and in response thereto generating said first and second clock signals; and controller means for receiving first and second reference voltages, said input power voltage, said input clock signal and said output power voltage and in response thereto generating said at least one control signal with first and second controllable circuit means having first and second conductances, respectively, responsive to said first and second reference voltages, said input power voltage and said output power voltage, wherein a conductance ratio is defined by a ratio of said first and second conductances, a first input ratio is defined by a ratio of said first reference voltage and said input power voltage, a second input ratio is defined by a ratio of said second reference voltage and said input power voltage, and said output ratio is defined by a selected combination of said conductance ratio and said first and second input ratios.

20. The apparatus of claim 19, further comprising voltage generator means for receiving said input power voltage and in response thereto generating said first and second reference voltages.

* * * * *

UNITED STATES PATENT AND TRADEMARK OFFICE
CERTIFICATE OF CORRECTION

PATENT NO. : 6,806,761 B1
DATED : October 19, 2004
INVENTOR(S) : Arlo Aude

It is certified that error appears in the above-identified patent and that said Letters Patent is hereby corrected as shown below:

Column 9,
Line 48, after "defined", please delete "is".

Signed and Sealed this

First Day of February, 2005

JON W. DUDAS
*Director of the United States Patent and Trademark Office*